United States Patent Office 3,772,223
Patented Nov. 13, 1973

3,772,223
PROCESS FOR THE PREPARATION OF A POROUS PLASTICS MATERIAL AND THE PRODUCT RESULTING THEREFROM
Roger de Broutelles, Hem, and Louis Duchene, Tourcoing, France, assignors to Etablissements Pennel & Flipo, Roubaix, France
No Drawing. Continuation-in-part of abandoned application Ser. No. 839,091, July 3, 1969. This application Apr. 14, 1972, Ser. No. 244,285
Claims priority, application France, July 22, 1968, 162,052
Int. Cl. C08g 22/44, 53/08
U.S. Cl. 260—2.5 AY 11 Claims

ABSTRACT OF THE DISCLOSURE

A process for preparing a porous plastic material comprising mixing a polymer selected from the polyurethanes, the polyamides and the condensation products of polyamides with epoxy resins with from 50 to 100%, by weight of the polymer, of a gel resulting from the admixture of a petroleum oil with from 10 to 30%, by weight of the petroleum oil, of a metal salt of an acid having the general formula R(COOH) in which R is a hydrocarbon radical containing at least 4 carbon atoms, shaping the resulting heterogeneous mixture into the desired form and removing at least a portion of the gel, which portion comprises substantially the entire petroleum oil.

---

This application is a continuation-in-part of application Ser. No. 839,091 and now abandoned.

The present invention relates to a process for preparing a porous plastic material capable of replacing leather and other more or less porous materials.

The object of the present invention is to provide a process for preparing a porous material which retains liquids on its surface and which is such that vapours pass therethrough under conditions similar to those of leather.

More particularly, the invention provides a process for preparing a porous plastic material comprising mixing a polymer selected from the polyurethanes, the polyamides and the condensation products of polyamides with epoxy resins with from 50% to 100%, by weight of the polymer, of a gel resulting from the admixture of a petroleum oil with from 10% to 30%, by weight of the petroleum oil, of a metal salt of an acid having the general formula RCOOH in which R is a hydrocarbon radical containing at least 4 carbon atoms, then shaping the resulting heterogeneous mixture into any desired form and removing at least a portion of the gel, which portion comprises substantially the entire petroleum oil.

The organic metal salt is advantageously a salt of an acid having the formula RCOOH in which R has 6–20 carbon atoms. R may be a saturated or unsaturated, straight or branched-chain radical and may carry substituents such as keto and amido groups.

Interesting results were obtained, for example, when selecting R among the stearyl, octanyl and lauryl sarcosyl radicals.

The meatl salt is advantageously selected from the alkali metal salts such as lithium and sodium, the salts of metals of Group II–A of the Periodic Table, such as magnesium and calcium, the salts of metals of Group III–A, such as aluminum, and the zinc salts.

The petroleum oil may be selected from the paraffinic, aromatic and naphthlenic hydrocarbons and mixtures hereof.

The gel may be produced by heating together the organic metal salt and the petroleum oil, for example between about 100° C. and about 250° C., to give a solution which, on cooling, sets to a gel similar to a hydrocarbon gel such as napalm. The gel is then worked mechanically and divided. In fact, such gels are known and are commercially available as lubricating grease.

The admixture of the gel and the polymer is preferably carried out at a temperature below about 30° C. The gel is then in a visco-plastic state which makes it possible to achieve readily a heterogeneous mixture.

It will be understood that alternatively this gel may be divided or worked after it has been put in the presence of the polymer.

The polymer may be admixed in the form of a solution within a solvent, said solvent being removed, for example by evaporation, after the shaping of the mixture.

In addition, the polymer may be admixed in the form of its components and may be polymerized, for example by heating, after the shaping of the mixture. This makes it possible to obtain cross-linked materials which possess good mechanical characteristics, which are insoluble and infusible and which may constitute in particular self-supporting porous materials.

Usual additives such as plasticizer, dye, pigment, antioxidant and/or antifungal agent may also be added to the polymer.

The heterogeneous mixture obtained on admixture of the polymer and the gel possesses at room temperature a liquid or pasty consistency, and may be shaped by any usual method such as by pouring, dipping, pressure moulding, spreading by means of doctor blades, rollers or brushes, rolling between rollers or spraying with a gun.

The resulting plastics mass can take the shape of a continuous or discontinuous sheet, of any object. It may be applied as a coating on a fabric or any surface. It can serve to impregnate or agglutinate foreign products such as textile fibres, mineral fillers, powders or wood shavings, and the like.

The removal of substantially the entire petroleum oil maybe carried out by evaporation in the case where the petroleum oil used is volatile. In the case where a heavy petroleum oil is used, the latter may be removed by dissolution within a suitable solvent. A portion of the organic metal salt may then be removed. It should be noted, however, that this salt may be allowed to remain in the porous material without any detrimental effect.

The remaining plastic mass is found to possess interesting porosity properties. It may serve in particular for the production of surgical dressings, filter diaphragams, seat covers, shoes, clothes and, generally, may serve as a substitute for leather and other more or less porous materials.

The following examples illustrate the invention. In these examples, the porosity of the plastic masses is measured by a test of permeability to steam, carried out under the conditions of the test described by Kanagy and Vickers in the "Journal of the Leather Chemists Association," vol. 45, pages 211–242, Apr. 19, 1950.

Under the conditions of this determination, the leather employed as reference allows through 500 g./m.$^2$/24 hours.

In the following examples, the permeability to steam values are expressed relative to this same leather employed as reference.

EXAMPLE 1

First Stage (I) Preparation of polymer A (I/1) A prepolymer of an isocyanate-terminated polyetherurethane having a molecular weight of approximately 2000, obtained by action of excess toluylene diisocyanate (T.D.I.) on poly(1,4-oxybutylene)glycol, in the form of a liquid having a viscosity of 14,000–19,000 cps. at 30° C. and a specific gravity of 1.06 is used.

(I/2) 100 parts of this prepolymer are mixed in a kneader with a paste formed by the dispersion of 5 parts titanium rutile dioxide in an equal amount of dioctyl phthalate (D.O.P.).

(I/3) After homogenization, there is added to the foregoing preparation a mixture in the molten state, or as a solution in 13 parts of an organic solvent such as anhydrous acetone, consisting of 12.5 parts of 4,4'-methylene-bis-(2-chloroaniline) with 0.4 part of adipic acid.

This latter mixture is first heated to 123° C. and then cooled to about 100° C.

Therefore, the polymer consists of the mixture of the prepolymer of isocyanate-terminated polyetheurethane with the colouring agent and the melted amine.

(II) Preparation of gel B (II/1) There are used 51 parts by weight of a mineral oil having the following composition, by weight:

| | Percent |
|---|---|
| 9-octyl heptadecane | 52 |
| Octadecylnaphthalene | 37.5 |
| Tetradecylbenzene | 10.5 |

(II/2) 9 parts of aluminum stearate are added thereto.

(II/3) This mixture is slowly heated, with stirring, until the soap has completely melted, at about 200° C. and is then cooled until a thick gel is obtained. This gel is worked mechanically until it is turned into a thin grease.

(III) Incorporation of A in B

This step is carried out with slow stirring, in a kneader for example, at a temperature below 30° C. There is obtained an unctuous paste, readily applied as a coating, which constitutes the heterogeneous mixture according to the invention. This mixture is shaped in accordance with any process usual in the transformation of plastic materials.

(IV) Test membranes are constructed to determine the porosity (IV/1) More particularly, an anti-adhesive surface such as glass or siliconized paper is coated with a thin layer of the heterogeneous mixture. The thickness of the coating or layer is from about 0.30 mm. to about 0.35 mm.

(IV/2) After treatment for 30 minutes at a temperature of 60° C. in an oven or a hot air tunnel, the material has sufficient cohesion and is sufficiently tack free to enable it to be rolled with its support.

Before passing to the second stage of the process, a pause is made to ensure a more complete polymerization of the polyurethane. The material is left standing, for example, 24 hours at a room temperature of about 20° C.

Second Stage

The material is separated from its support, treated by dipping for 10 minutes in "C" gasoline, with slow stirring, at a temperature of 40° C., and then dried. "C" gasoline is a paraffinic solvent having the following characteristics:

aromatic content less than 4% (according to French standard NF.M.07,016),
distillation range between 70° and 100° C. (according to French standard NF.M.07,002),
aniline point: 57.8° C. (according to French standard NF.M.07,021).

The resulting film is flexible and, according to the Kanagy and Vickers method, has a permeability to steam which is from 2 to 5 times that of the reference leather.

EXAMPLE 2

First Stage (I) Preparation of polymer A (I/1) There is used a primary hydroxy-terminated polyurethane elastomer obtained by polycondensation of 11 moles of ethylene glycol polyadipate having a molecular weight of 2000, a hydroxyl number of 56, with 10 moles of diphenylmethane 4,4'-diisocyanate (M.D.I.).

(I/2) 100 parts of said elastomer are admixed with 2 parts carbon black, using a roller mixer.

(I/3) This coloured mixture is dissolved in 300 parts anhydrous ethyl acetate.

(I/4) To this solution are added 25 parts of a 75% solution in ethyl acetate of a triisocyanate obtained by condensing 1 mole 1,1,1-trimethylol propane with 2 moles toluene, 2,4-diisocyanate.

(II) Preparation of gel B

The procedure described in Example 1 is used.

(III) Mixture of A and B

A and B are mixed at room temperature, with slow stirring, to give an unctuous paste, readily applied as a coating, which constitutes the heterogeneous mixture according to the invention.

This mixture is shaped according to any process usual in the technology of the transformation of plastic materials.

(IV)

(IV/1) Identical to Example 1.

(IV/2) After treatment, the solvent is evaporated off at moderate temperature and the material is then rolled up and stored.

Before passing on to the second stage of the process, a pause is made to ensure a more complete polymerization of the polyurethane. For example, a period of 4 to 5 days storage at room temperature is suitable.

Second Stage

The material is separated from its support and is then treated as described in Example 1.

The resulting film possesses a permeability to steam which, according to the test method previously indicated, is from 0.5 to twice that of the reference leather.

EXAMPLE 3

(I) Preparation of polymer A (I/1) There are used 100 parts of thermoplastic polyurethane elastomer consisting of a urethane polyester obtained by reaction of 15 moles of diphenylmethane 4,4'-diisocyanate (MDI) with 16 moles of 1,4-butanediol polyadipate having a molecular weight of 2000 and a hydroxyl number of 56.

This elastomer, having a molecular weight of about 35,000, is worked mechanically with 1% caprolactam to consume the residual isocyanates.

(I/2) This elastomer is coloured by admixture with 2 parts of carbon black. This admixture may be carried out in the hot, at the softening temperature of the thermoplastic elastomer, at about 140° C., by means of a roller mixer.

(I/3) This coloured elastomer is dissolved in 215 parts of methyl ethyl ketone.

(II) Preparation of gel B

The procedure described in Example 1 is used.

(III) Mixture of A and B

A and B are mixed at room temperature, with slow stirring, to give an unctuous paste, readily applied as a coating, which constitutes the heterogeneous mixture according to the invention.

Second Stage

As in Example 1.

The resulting film possesses a permeability to steam, according to the test method previously indicated, which is equal to ⅔ of that of the reference leather.

EXAMPLE 4

First Stage (I) Preparation of polymer A

As in Example 1.

(II) Preparation of gel B (II/1) There are used 51 parts of a relatively volatile paraffinic oil having the following composition, by weight:

| | Percent |
|---|---|
| Decane | 30 |
| Undecane | 70 |

(II/2) To this oil are added 9 parts of aluminum stearate (organic acid salt).

(II/3) This mixture is gradually brought to the melting temperature of soap, about 100° C., with continued stirring until perfect homogeneity is achieved.

This mixture is slowly cooled. It is then in the form of a thick gel which is mechanically worked to give a thin grease.

(III) Mixture of A and B

A and B are mixed with slow stirring, at a temperature below 30° C., to give an unctuous paste, readily applied as a coating, which constitutes the heterogeneous mixture according to the invention. This mixture is shaped according to any process usual in the technology of the transformation of plastic materials.

(IV)

(IV/1) Identical to Example 1.

(IV/2) The material and its support are placed in an enclosure at room temperature saturated with the vapour of the petroleum oil used to produce the gel. After twenty-four hours, the material is removed from the enclosure.

Before passing on to the second stage of the process, a pause is made, for example, to ensure a more complete polymerization of the polyetherurethane. A pause of twenty-four hours at room temperature is prescribed.

Second Stage

The material and its support are removed from the enclosure, separated from each other and the film is dried.

The resulting flexible film possesses a permeability to steam which, according to the test method previously indicated, is from 2.5 to 4 times that of the reference leather.

EXAMPLE 5

First Stage (I) Preparation of polymer A

As in Example 1.

(II) Preparation of gel B

As in Example 1.

(III) As in Example 1

(IV)

(IV/1) As in Example 1.

(IV/2) The material and its support are placed in an enclosure saturated with the vapour of the petroleum oil used to produce the gel, at a temperature of 100° C.

After ten minutes at this temperature, the film and its support are removed from the enclosure and are then immersed in the petroleum oil at room temperature.

Second Stage

After 24 hours of immersion, the material and its support are removed from the oil and separated from each other, after which the film is dried as indicated in Example 1.

The resulting film possesses a permeability to steam, according to the test method previously indicated, which is from 1.5 to 5 times that of the reference leather.

EXAMPLE 6

First Stage

Identical to Example 4 up to (IV/1) inclusive.

(IV/2) After a residence time of ten minutes at a temperature of 100° C. in the enclosure saturated with the vapours from the petroleum oil, the film and its support are removed from the oil, soaked with the same petroleum oil and then rolled up in the wet state.

The rolled article is wrapped in a packing which is impermeable to the vapour of the petroleum oil.

Before passing onto the second stage of the process, a 24 hour pause is made for example, at room temperature, to ensure a more complete polymerization of the polyetherurethane.

Second Stage

As in Example 4.

The resulting film possesses a permeability to steam, according to the test method indicated, which is from 0.5 to 3 times that of the reference leather.

EXAMPLE 7

(I) Preparation of polymer A

As in Example 1.

(II) Preparation of gel B (II/1) There are used 51 parts of a paraffinic oil having the following composition, by weight:

| | Percent |
|---|---|
| Undecane | 10 |
| Dodecane | 39 |
| Tridecane | 45 |
| Tetradecane | 5 |
| Triethylbenzene | 1 |

(II/2) To this oil are added 9 parts of aluminum octanoate (organic acid salt).

(II/3) This mixture is left aside several hours at room temperature, until a thick gel is obtained. This gel is worked mechanically until it turns into a thin fatty substance.

(III)

B is incorporated in A at a temperature below 30° C., with slow stirring in a kneader.

There is obtained a readily coated unctuous paste which constitutes the heterogeneous mixture according to the invention. This mixture is shaped according to any process usual in the technology of the transformation of plastic materials.

(IV) Production of test membranes for the determination of porosity (IV/1) As in Example 4.
(IV/2) As in Example 4.

Second Stage

As in Example 4.

The resulting flexible film possesses a permeability to steam, according to the test method previously indicated, which is from 1.5 to 4 times that of the reference leather.

EXAMPLE 8

Steps (I), (II) and (III) are the same as in Example 7, except for (II/1) in which the amount of petroleum oil is 68 parts and the amount of organic acid salt is 12 parts.

(IV/1) As in Example 7.

(IV/2) The material and its support are placed in an enclosure saturated with the vapours of the petroleum oil used to produce the gel, at a temperature of 60° C.

After twenty minutes at this temperature, the material and its support are removed from the enclosure and then immersed in the petroleum oil, at room temperature.

Second Stage

After 24 hours of immersion, the material and its support are removed from the oil, separated from each other, and the film is then dried as in Example 5.

The resulting film possesses a permeability to steam, according to the test method previously indicated, which is from 1 to 3 times that of the reference leather.

EXAMPLE 9

First Stage (I) Preparation of polymer A

As in Example 1.

(II) Preparation of gel B (II/1) As in Example 1.

(II/2) To the material described under (II/1) are added 9 parts sodium lauryl sarcosinate (organic acid salt).

The gel is prepared as in Example 1.

(II/3), (III) and (IV) are the same as in Example 1.

The resulting film possesses a permeability to steam, according to the test method previously indicated, which is from 1 to 3 times that of the reference leather.

EXAMPLE 10

(I) Preparation of polymer A

As in Example 1.

(II) Preparation of gel B (II/1) As in Example 1.

(II/2) To the material described under (II/1) are added 9 parts sodium stearate (organic acid salt). The mixture is heated until the soap is melted, at 200–240° C., with slow stirring, and is then cooled to give a thick gel.

The preparation is then carried out as in Example 1.

The resulting film possesses a permeability to steam, according to the test method previously indicated, that is from 2 to 5 times that of the reference leather.

EXAMPLE 11

First Stage (I), (II) and (III) are as in Example 1.

(IV/1) A thin layer of the mixture is coated over an anti-adhesive surface, for example of siliconized paper. This layer is lined with an unwoven substrate backing, having a specific gravity of about 0.5 and a weight of 450 g./m.$^2$, or a conventional textile backing of linen or jersey type.

(IV/2) After treating for 30 minutes at a temperature of 60° C. in an oven or a hot air tunnel, the assembly is wound up as indicated in Example 1.

Before passing on to the second stage of the process, a pause is made to ensure a more complete polymerization of the polyetherurethane. The material is left standing, for example, 24 hours at room temperature.

Second Stage

As in Example 1.

An imitation leather is obtained, whose permeability to steam is equal to that of the reference leather.

EXAMPLE 12

(I), (II) and (III) as in Example 1.

(IV/1) The resulting mixture is poured into a mould previously treated with an unmoulding agent (silicone oil).

(IV/2) Before passing on to the second stage, a waiting period of 48 hours is allowed to elapse to ensure a more complete polymerization of the polyetherurethane, at room temperature.

Second Stage

The moulded article is removed from the mould, treated by washing in "C" gasoline at a temperature of 40° C., during a period of time which is dependent on the size of the article produced, and is then dried.

EXAMPLE 13

First Stage (I) Preparation of polymer A

A solution of 43 parts of a 66/6 copolyamide obtained by copolymerizing hexamethylene diamine with adipic acid and ε-aminocaproic acid in a solvent mixture consisting of 77 parts methylated spirit and 23 parts water is used as polymer A.

(II) Preparation of gel B

As in Example 1.

(III) Incorporation of A in B

As in Example 1.

(IV) Test membranes are constructed to determine the porosity (IV/1) More particularly, a thin layer of the heterogeneous mixture is coated over an anti-adhesive surface, such as glass or siliconized paper. The layer is about 0.70 mm. thick.

(IV/2) The solvent is evaporated off at a temperature below 40° C.

Second Stage

As in Example 1.

The resulting film is flexible and possesses a permeability to steam, according to the test method previously indicated, which is equal to that of the reference leather.

EXAMPLE 14

First Stage (I) Preparation of polymer A (I/1) There are used 70 parts of liquid polyamide obtained by condensing dimerized linoleic acid with diamines, prepared according to the process described in U.S. Pat. 2,379,413, General Mills, Kankakee, Ill., U.S.A., and having the formula:

in which R is an alkyl radical having 34 carbon atoms. This material has an amine number of about 220.

(I/2) To this polyamide are added, with stirring, at a temperature below 30° C., 30 parts of an epoxy resin formed by reacting epichlorohydrin with bisphenol A, having an average molecular weight of 450 and an epoxy equivalent of 225–290, dissolved in 70 parts of toluene.

Thus, polymer A consists of the mixture of the liquid polyamide and the epoxy resin solution.

(II) Preparation of gel B

As in Example 1.

(III) Mixture of A and B

As in Example 1.

(IV) Test membranes are constructed to determine the porosity (IV/1) More particularly, a thin layer of the heterogeneous mixture is coated over an anti-adhesive surface, such as glass or siliconized paper. The layer is about 0.40–0.45 mm. thick.

(IV/2) After treating during 2 hours at 60° C. in an oven or in a hot air tunnel, the material may be separated from the anti-adhesive surface.

Second Stage

As in Example 1.

The resulting film possesses a permeability to steam, according to the test method previously indicated, which is equal to 2.5 times that of the reference leather.

It should be understood that the present invention is not to be considered limited to any of the specific embodiments herein described but may be used in other ways without departure from the spirit of the invention or the scope of the appended claims.

In particular, there has been described in the examples only the production of products in the form of a sheet or the coating of products containing textile fibres, solely to facilitate the production of test pieces whose permeability can be determined under comparable operating conditions, but the process according to the invention is not limited to the production of plastics masses in this form and includes within its scope the production of any porous plastic material in any form whatever.

Having now described our invention, what we claim as new and desire to secure by Letters Patent is:

1. A process for preparing a porous plastic material comprising mixing a polymer selected from the group consisting of the polyurethanes, the copolyamides based upon hexamethylene diamine and adipic acid and ε-aminocaproic acid soluble in aqueous methanol, and the condensation products of amine terminated polymeric fat acid polyamides with epoxy resins, with from 50 to 100%, by weight of the polymer, of a gel resulting from the admixture of a petroleum oil with from 10 to 30%, by weight of the petroleum oil, of a metal salt of an acid having the formula R(COOH) in which R is a hydrocarbon radical containing at least 4 carbon atoms, this metal salt being selected from the group consisting of the alkali metal salts, the salts of the metals of Group II–A, the salts of the metals of Group III–A and the zinc salts, shaping the resulting heterogeneous mixture into the desired form and removing at least a portion of the gel, which portion comprises substantially the entire petroleum oil.

2. A process as claimed in claim 1, wherein R contains from 6 to 20 carbon atoms.

3. A process as claimed in claim 1, wherein R is selected from the group consisting of the stearyl, octanoyl and lauryl sarcosyl radicals.

4. A process as claimed in claim 1, wherein the alkali metal salt is selected from the sodium and lithium salts, the Group II–A metal salt is selected from the magnesium and calcium salts and the Group III–A metal salt is the aluminum salt.

5. Process as claimed in claim 1, wherein the petroleum oil is selected from the group consisting of the paraffinic hydrocarbons, the aromatic hydrocarbons, the naphthenic hydrocarbons and the mixtures thereof.

6. A process as claimed in claim 1, comprising heating together said organic metal salt and said petroleum oil at a temperature of about 100° to about 250° C. so as to obtain a solution, allowing this solution to cool until a gel is obtained and mechanically dividing said gel prior to admixing it with the polymer.

7. A process as claimed in claim 1, wherein the admixture of the gel and of the polymer is carried out at a temperature below about 30° C.

8. A process as claimed in claim 1, wherein the polymer is admixed in the form of a solution.

9. A process as claimed in claim 1, wherein the petroleum oil is volatile and is substantially entirely removed by evaporation.

10. A process as claimed in claim 1, wherein the petroleum oil is heavy and is removed substantially entirely by dissolution.

11. A porous plastic material prepared by a process comprising mixing a polymer selected from the group consisting of the polyurethanes, the copolyamides based upon hexamethylene diamine and adipic acid and ε-aminocaproic acid soluble in aqueous methanol, and the condensation products of amine terminated polymeric fat acid polyamides with epoxy resins, with from 50 to 100%, by weight of the polymer, of a gel resulting from the admixture of a petroleum oil with from 10 to 30%, by weight of the petroleum oil, of a metal salt of an acid having the formula R(COOH) in which R is a hydrocarbon radical containing at least 4 carbon atoms, this metal salt being selected from the group consisting of the alkali metal salts, the salts of the metals of Group II–A, the salts of the metals of Group III–A and the zinc salts, shaping the resulting heterogeneous mixture into the desired form and removing at least a portion of the gel, which portion comprises substantially the entire petroleum oil.

References Cited
UNITED STATES PATENTS

| | | | |
|---|---|---|---|
| 3,486,911 | 12/1969 | Goldstein | 117—135.5 |
| 3,169,885 | 2/1965 | Golodner | 117—63 |
| 3,222,208 | 12/1965 | Bertollo | 117—63 |
| 3,519,459 | 7/1970 | Hofmann | 117—135.5 |
| 3,378,507 | 4/1968 | Sargent | 260—2.5 M |

DONALD E. CZAJA, Primary Examiner

C. W. IVY, Assistant Examiner

U.S. Cl. X.R.

117—63, 135.5; 260—2.5 BD, 2.5 EP, 2.5 M; 264—41, 49